Figure 1:
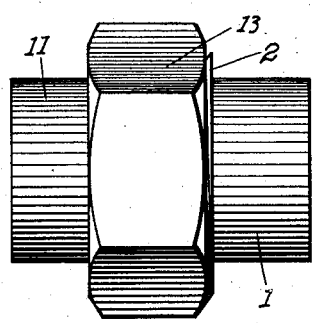

E. J. CORBETT.
FLEXIBLE AIR OR STEAM JOINT.
APPLICATION FILED AUG. 15, 1910.

1,027,694.

Patented May 28, 1912.

Witnesses
Frank H. Carter
Cora B. Carter

Inventor
Edward J. Corbett
By Percy G. Webster
Attorney

UNITED STATES PATENT OFFICE.

EDWARD J. CORBETT, OF SACRAMENTO, CALIFORNIA.

FLEXIBLE AIR OR STEAM JOINT.

1,027,694.  Specification of Letters Patent.  Patented May 28, 1912.

Application filed August 15, 1910. Serial No. 577,331.

*To all whom it may concern:*

Be it known that I, EDWARD J. CORBETT, a citizen of the United States, residing at Sacramento, in the county of Sacramento, State of California, have invented certain new and useful Improvements in Flexible Air or Steam Joints; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in joints for pipes carrying air, steam or other fluid pressure the object of the invention being to produce a joint which will be fluid pressure tight and still be flexible and having a swiveling movement for the purpose of permitting successfully the joining of two pipes between two independent bodies such as a train line or the like.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claim.

In the drawings similar characters of reference indicate corresponding parts in the several views.

Figure 2:
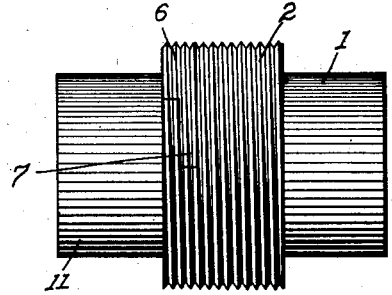
Figure 3:
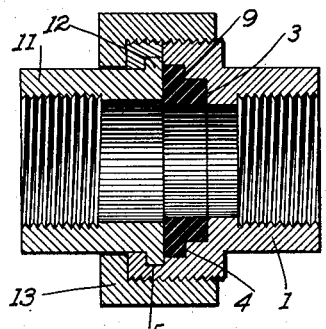
Figure 4:
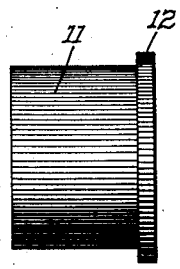
Figure 5:
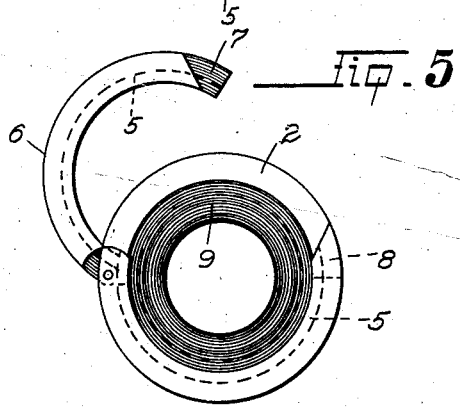
Figure 6:
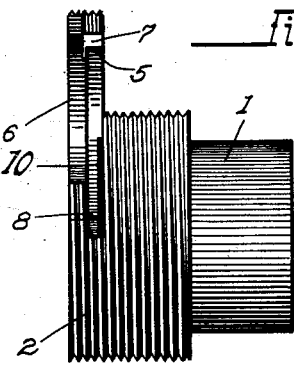

Figure 1 is a side elevation of my improved joint complete. Fig. 2 is a similar view with a lock nut removed. Fig. 3 is a vertical longitudinal section of the device. Fig. 4 is a side elevation of the coupling member used in the device. Fig. 5 is a front elevation of the device with a locking nut removed and the parts shown disassociated. Fig. 6 is a side elevation of the same.

Referring now more particularly to the characters of reference on the drawings 1 designates one of the coupling members of the joint having a threaded shoulder 2 provided with a recess 3 and an adjacent recess 4 of a greater diameter than said recess 3 and also with a third recess 5 of a greater diameter than said recess 4 said recess 5 also being of a greater diameter than the inside diameter of said collar 2. Collar 2 also has a segmental arm 6 cut therefrom and disposed in hinged relation thereto said arm 6 having a projecting lip 7 adapted to fit into a slot 8 to form a close joint with said shoulder 2 when said arm 6 is placed in closed position.

In practice a rubber or other flexible gasket 9 is inserted into the recesses 3 and 4 and projects to a slight degree beyond the recess 4 as at 10 and then when the arm 6 is open, the other coupling member 11 having a flange or collar 12 is inserted into the member 1 said flange or collar 12 forcing the gasket 9 flush with the outside of the recess 4 and also fitting into recess 5 as shown in Fig. 3. Then the arm 6 is closed into position to form the complete shoulder 2 as shown in Fig. 2 and then a nut 13 is mounted on the threaded shoulder 2 holding the arm 6 and incidentally all the described parts in proper position thus forming a joint which is fluid pressure tight and still has a swiveled movement by reason of the collar 12 turnable in the recess 5.

In using this joint on a train line or other connection for two independent bodies, a series of them are used at such angular position with respect to one another as to permit a complete swiveled movement between said two independent bodies.

From the foregoing description it will readily appear that I have produced such a joint as is fluid and pressure tight and yet capable of having a swiveling motion as described.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A joint comprising a coupling member having a threaded portion, an arm cut from said threaded portion and being hinged thereto, said arm having a projecting lip, said threaded portion having a recess to receive said lip, there being a recess in said coupling member and in said arm and lip, said last named recess being of a greater diameter than the inner diameter of said coupling member, another coupling member having a collar adapted to fit in said last named recess and a nut mounted on said threaded portion, as described.

In testimony whereof I affix my signature in presence of two witnesses.

EDWARD J. CORBETT.

Witnesses:
PERCY S. WEBSTER,
J. D. F. WYLDER AYER.

Copies of this patent may be obtained for five cents each, by addressing the "Commissioner of Patents, Washington, D. C."